March 20, 1928.
H. C. ANDERSON
AUTOMOBILE TIRE
Filed May 4, 1926
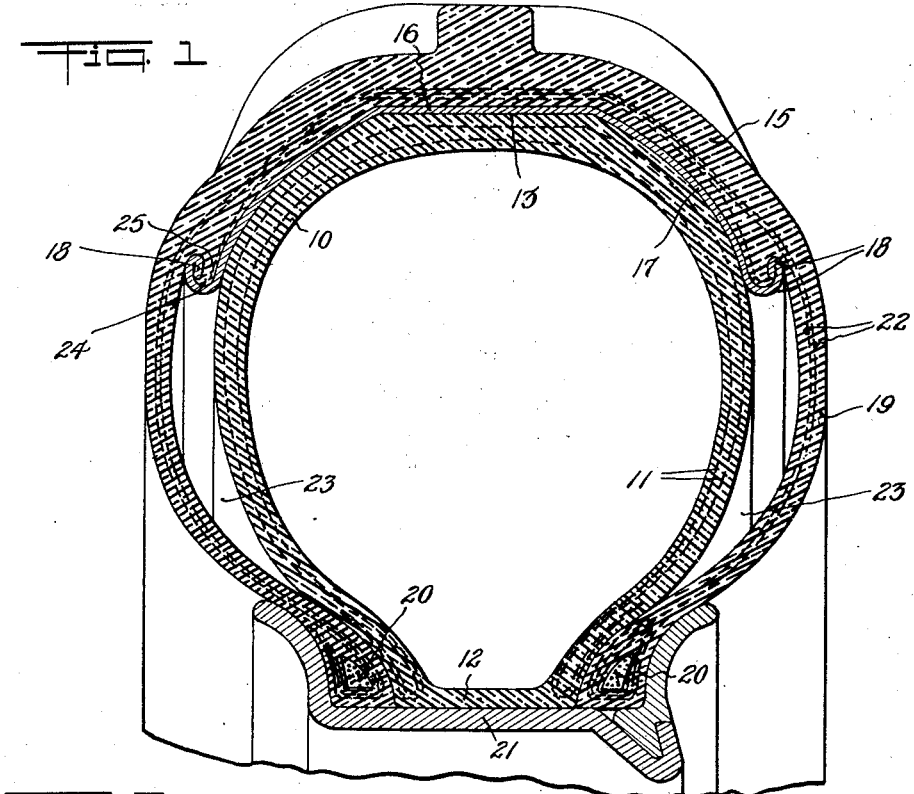
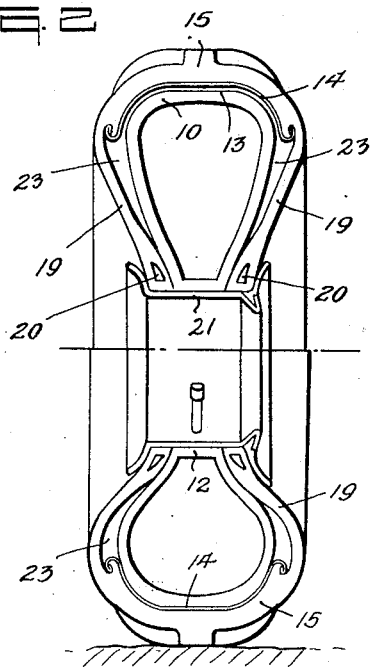
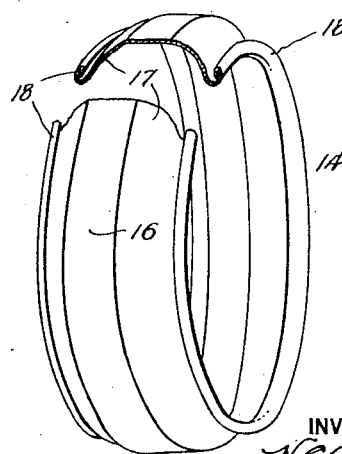
INVENTOR
H. C. Anderson
BY
ATTORNEY Patented Mar. 20, 1928.

1,663,511

UNITED STATES PATENT OFFICE.

HIRAM C. ANDERSON, OF NEW YORK, N. Y.

AUTOMOBILE TIRE.

Application filed May 4, 1926. Serial No. 106,622.

This invention relates to resilient wheels and has particular reference to tire structures for road vehicles such as automobiles, motorcycles, or the like.

Among the objects of the invention is to provide a resilient tire comprising what is in the nature of a single tube pneumatic tire and a protector for such tire comprising a puncture proof tread portion and means to anchor the side portions of the tread member in proximity to the rim mechanism that supports and holds the pneumatic tire.

A further object of the invention is to provide a puncture proof mechanism including a metallic tread structure equipped with means for preventing the overheating of the pneumatic tire borne within the circumference of the tread member.

A still further object of the invention is to provide a pneumatic tire, and armor or protector means for said tire of such nature as to prevent rim cutting of the tire in case of accidental or temporary loss of internal pressure of air in said tire.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a transverse sectional view of a preferred embodiment of my invention shown in place on a conventional rim structure and indicating the normal running form of the structure when under inflation.

Fig. 2 is a diagram in vertical central section indicating the relation of the parts to one another when the pneumatic tire is deflated and indicating how the depression of the load with respect to the roadway is limited by the tire armor or protector mechanism.

Fig. 3 is a detail perspective view, partly broken away, of the metallic protecting tread member.

Referring now more specifically to the drawings, I show my improvement as comprising two principal and closely co-operative parts,—a single tube tire 10, which having the usual characteristics of single tube tires is so built as to include a plurality of plies of fabric re-enforcements 11 so molded or otherwise formed as to be strongly impregnated with rubber or rubber composition making a flexible but non-stretchable construction and so capable of sustaining internal pressure of air as a result of inflation according to the usual practice of pneumatic tires and having sufficient inherent strength to sustain the normal load and prevent outward bursting. A portion or band, however, of the tire 10 along its inner circumference 12 is left preferably as solid or pure rubber, without fabric or carcass, the better to adapt the tire for feeding into operative position. Such band 12, however, has sufficient inherent strength to resist the internal air pressure from unduly expanding the side portions of the tire from each other. The outer circumference or periphery of the tire 10 is preferably formed to have a flat or cylindrical tread 13.

The other main portion of the invention is a tire protector comprising a rigid metallic armor 14 and a resilient tough flexible but non-elastic tread portion or coating 15. These two parts 14 and 15 are vulcanized together and so constitute a unit into which the tire 10 is inserted before being applied to the wheel.

The rim or armor 14 is made of metal in channel form for rigidity and strength and includes a flat or cylindrical tread portion 16, two rounded side portions 17, and lateral beads 18 formed by rolling the edges of the metal sharply upon themselves, making an exceedingly strong and rigid margin for each one. The main portion of this member conforms to the external or tread portion of the tire 10 which fits thereinto. The marginal rolls or beads 18 provide also an exceedingly strong interlock between the armor and the tread member 15 whereby tendency for the tread member to be stripped laterally from the armor or drawn inward toward the hub of the wheel is prevented. The protector for the tire includes also two relatively thin side hanger portions 19 each terminating in an anchor bead 20 which has interlocking communication in any conventional manner with the rim 21 of the wheel. To add to the strength and non-elasticity of the protector I provide a plurality of plies 22 of fabric, cords, or other carcass structure which is strongly interlocked with the wire or other construction of anchor means at 20 so as to prevent any possibility of stretching or enlarging the anchor portions of the tire protector with respect to the rim. In other words, the anchor members 20 bind the adjacent portions of the tire protector in fixed position upon the rim after the parts are assembled. As viewed in Fig. 1 the hanger portions 19 are longer or fuller than the proximate side portions of the tire and are spaced therefrom leaving clearances at 23 or dead air spaces between the tire and the sides of the protector.

The hook or interlocking portions of the protector at 24 which project into the beads 18 include a portion of the fabric or carcass construction at 25. In other words, as shown there are three plies of the fabric extending across the main heavy thick tread portion of the protector, one of which terminates at its side edges within the rolls or turns of the beads 18, while the other two extend all the way inward along the hangers and are firmly interlocked with the anchor rings 20 so that no part of the protector is sufficiently elastic to be stretchable along radial lines for reasons soon to appear.

The armor ring 14 is formed by rolling, the action of the rolls being endwise of the metal or circumferential of the ring, and after the metal is properly shaped the ends thereof are welded, making a unitary continuous and inflexible ring. The tread portion 15 is then built upon the ring 14 and firmly vulcanized thereon, leaving the hanger portions free from the ring. The tire 10 then is inserted into the protector in a manner similar to the insertion of an ordinary inner tube into a standard shoe, the tire being deflated for such insertion. After the parts are assembled and applied to the wheel and there locked in any well known or conventional manner the tire 10 is inflated but at a much lower degree of pressure than is usually practised. I have found that an internal pressure of from fifteen to eighteen pounds is ample for the purpose, taking into consideration the character of the external protection afforded by the protector parts 14 and 15. The main parts are so locked and gripped together that no relative circumferential movement can take place between the two parts and from the nature of the ring or armor 14 it must be understood that all conditions which ordinarily tend to rim cut, puncture, or rupture the pneumatic tire, such as commonly obtained in ordinary pneumatic tire structures, are prevented by the protector member. The ring 14 is sufficiently strong to maintain its circular form under all running or road conditions. When the wheel strikes a curb stone, cobble stone, railroad rail, or other obstacle that tends to dent, puncture, or distort an ordinary tire, the impact is received by the tread armor as a whole and is distributed throughout approximately one-half of the wheel instead of being communicated along a single spot or point of the wheel. This is one of the reasons therefore why a low degree of internal pressure is sufficient to maintain the wheel in proper running condition. Again, since the tread member is so relatively rigid the pneumatic elasticity that obtains in a high degree in this construction depends upon the low degree of inflation of the tire and is communicated along the tire in a totally different manner from that in the usual construction. That is to say, the normal load either with or without shock is supported upon the lower half of the armor 14 as an annular member instead of being supported upon the bottom or the point of contact with the road obstacle, and this is another reason why a low degree of internal inflation is ample.

The dead air spaces 23 serve a number of important advantages constituting immediately air cushions or pockets which resist to a large extent the lateral bulging of the side portions of the tire 10. While it is not presumed that the air is trapped in these pockets hermetically, yet the joint between the anchor portions of the tire and protector is sufficiently tight to prevent any free outflow of the air along said pockets when lateral pressure takes place. Again, these pockets of air constitute cooling means or means to prevent heating of the pneumatic tire 10 for several reasons as follows: First, the covering for the pneumatic tire constitutes immediately a shade therefor, keeping the direct rays of the sun or other source of external heat from acting thereupon and causing too high inflation of the air therein or other damages due to heat. The air pockets provide means for continual circulation or exchange of air, and the lateral portions of the tire and protector being spaced constantly from each other on opposite sides of the pockets, there can be no rubbing friction between them as would generate heat such as is observed in many tire constructions now in use.

From what has been stated thus far it is to be understood that this new construction is essentially a pneumatic tire structure, having not only the appearance of the normal pneumatic wheel, but the riding characteristics thereof, although a much more satisfactory one because of the superior resiliency and reliability of the pneumatic tire 10, but in addition to these characteristics one of the principal features of the improvement resides in the fact that even though the normal low pressure of the air in the tire should become reduced as from a leaky valve or other causes, the hanger portions 19 of the tread are of sufficient strength to sustain the load and prevent rim cutting or other damage to the construction. The action under these conditions is shown by the diagram of Fig. 2, wherein the upper portion of the figure represents the upper half of the wheel when the tire 10 is deflated, the hangers 19 being thus under tension, serving to sustain the rim 21 and parts therein incident to the load and preventing the same from sagging to the ground or so close to the tread at the ground as to cause rim cutting or other damage. The lower portion of this figure shows the bottom of the rim 21 dropping as low as possible toward the ground but prevented from dropping farther by reason of the overhead hangers. Under these circumstances it will be understood that the rim or armor 14 maintains its standard relation to the ground or roadway and also maintains its circular form so that the load is in effect hung from the top of the armor 14 by virtue of the hangers 19. Under ideal conditions it is presumed that in no pneumatic wheel structure is there a great deal of eccentricity permitted or intended to be permitted as between the rim 21 and the external circumference or periphery of the tire.

I claim:

1. The herein described pneumatic tire tread protector adapted to have direct association with the tread portion of said tire, the protector having side portions of flexible but non-elastic structure constituting hangers, the tread portion of the protector including a rigid metallic armor ring having continuous annular side beads whose edges are rolled closely upon themselves and serve to maintain at all times said hangers in spaced relation to the sides of the tire, forming constant lateral air cushions between the hangers and the tire.

2. A pneumatic tire tread protector, the protector having a tread portion adapted to have direct contact with the tread portion of the tire and having rim beads adapted to have direct lateral contact with the rim portion of the tire to prevent lateral spreading thereof, the side portions of the protector being of flexible non-elastic construction and serving to constitute hangers to support the load in case of under inflation, the tread portion of the protector including also a rigid channel member having rounded lateral annular beads rolled laterally and thence radially toward the tread and constituting means to hold the hanger portions of the protector spaced constantly from the tire.

3. A tire protector as set forth in claim 2 in which the channel member is formed flat in cross section for a substantial width along its immediate tread.

4. A tread protector as set forth in claim 2 in which the channel member lateral beads have their extreme edges rolled laterally thence outward and thence inward and spaced from the unrolled structure, and the flexible portion of the tread is provided with a carcass structure extending into the bead spaces, said tread portion of the protector being vulcanized to the channel member.

In testimony whereof I affix my signature.

HIRAM C. ANDERSON.